No. 656,344. Patented Aug. 21, 1900.
R. M. COX.
VAULT LIGHT.
(Application filed July 5, 1900.)

(No Model.)

WITNESSES.

INVENTOR.
Robert M. Cox
By his atty

UNITED STATES PATENT OFFICE.

ROBERT M. COX, OF PHILADELPHIA, PENNSYLVANIA.

VAULT-LIGHT.

SPECIFICATION forming part of Letters Patent No. 656,344, dated August 21, 1900.

Application filed July 5, 1900. Serial No. 22,493. (No model.)

*To all whom it may concern:*

Be it known that I, ROBERT M. COX, of the city and county of Philadelphia and State of Pennsylvania, have invented an Improvement in Vault-Lights, of which the following is a specification.

My invention relates to vault-lights; and it consists of the improvements which are fully set forth in the following specification and are shown in the accompanying drawings.

In vault-lights, which as generally used are subjected to considerable travel and traffic, much difficulty has been experienced owing to the liability of the incident light-transmitting surfaces becoming scratched and roughened by the feet of pedestrians and the passage of other objects. Such scratching and roughening of the incident surfaces seriously impairs the efficiency of the lights.

It is one of the objects of my invention to enable the incident surfaces to be effectively protected from contact with the feet of pedestrians and with other passing objects, so that they may not become scratched or worn and their light-transmitting qualities may not be impaired.

It is also an object of my invention, while accomplishing this result, to improve the foothold afforded by the upper surface of the light, thus preventing slipping.

It is also an object of my invention to improve the light-transmitting action of the vault-light, so that by means of lenses the light-rays may be more effectively changed in direction to suit the particular requirements in lighting up dark interiors.

Difficulty has also been experinced in keeping the vault-lights clean and free from an accumulation of dust and of mud and dirt collected from the feet of pedestrians.

It is also an object of my invention to provide a vault-light with an upper surface which may easily be washed and kept clean and in which there are no pockets or angles for the lodgment of dirt and dust.

Figure 1:
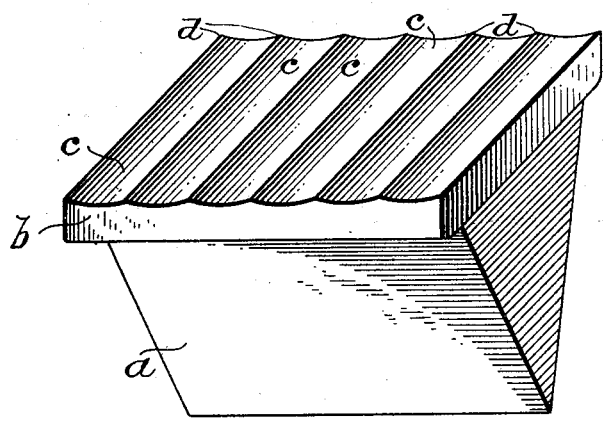
Figure 2:
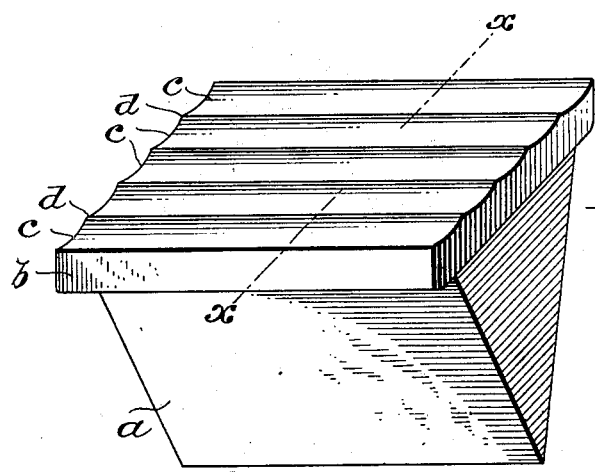
Figure 3:
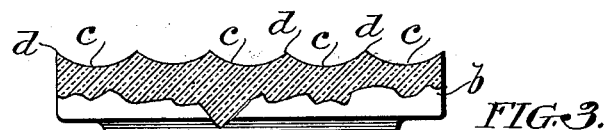

In the drawings, Figure 1 is a perspective view of a vault-light embodying my invention. Fig. 2 is a similar view illustrating another form thereof, and Fig. 3 is a transverse vertical section on the line $x\ x$ of Fig. 2.

Each vault-light consists of a unitary piece of glass or translucent material adapted to be placed singly or in combination with others in a suitable frame, as is now well known in the art. The light consists of a single prism $a$ of suitable size and prismatic angle to suit the conditions, arranged upon the under side and depending from a horizontal top $b$, the side edges of which preferably project laterally beyond the top of the prism and the upper surface of which is provided with a series of concave grooves $c$, forming with their meeting edges a series of more or less sharp angular ridges $d$. These grooves $c$ and the ridges $d$ formed by them are of much less size than the single prism $a$, so that each light has a single relatively-large and extended prism on the lower side and a series of relatively-small concave lenses and angular ribs on the upper or incident side. These grooves $c$ and ribs $d$ may be arranged either transversely to the direction of the prism $a$, as shown in Fig. 1, or parallel thereto, as in Figs. 2 and 3, and in other cases, when the conditions render it expedient, they may be arranged diagonally to the direction of the prism. As the effective incident surfaces afforded by the top $b$ of light are the concave lenses $c$, and as these concavaties are of small width, they will be effectively protected from contact with the feet of pedestrians and objects passing over them, which will make contact only with the raised angular ribs or ridges $d$, and consequently the refracting-lense surfaces $c$ will not become scratched and worn, and their light-transmitting efficiency will not be impaired by travel and traffic. Not only do the angular projecting ribs $b$ thus serve to protect the incident light-transmitting surfaces $c$ from contact with objects passing over them, but they also serve the purpose of preventing a firmer foothold for pedestrians and prevent slipping. Another advantage of this surface construction of my improved vault-light is the facility with which it may be washed and kept clean. The concave grooves form gutters through which the mud and dust may be readily carried away, and there are no small recesses or grooves forming pockets in which particles of dust and dirt may become lodged.

The effect of the prism in refracting the light passing through it is well understood, and the concave lenses perform the further well-known function of a lense of producing an additional angular deviation of the light-rays, so that the emergent rays are more widely spread out, and consequently the dark interiors may be effectively illuminated. By changing the angular disposition of the lenses and ribs relatively to the prism $a$ this extra angular deviation produced by the lenses may be obtained in any desired direction to suit the special requirement of the interior space to be illuminated.

The details of construction may be varied without departing from the invention.

What I claim as new, and desire to secure by Letters Patent, is as follows:

1. A vault-light of translucent material, consisting of a single elongated prism depending from a flat top portion which is provided with a series of relatively-small concave grooves meeting in a series of angular ribs, said ribs presenting a roughened foot-surface and protecting the faces of the concave grooves from contact with the feet of pedestrians.

2. A vault-light of translucent material, consisting of a single elongated prism depending from a flat top portion which is provided with a series of relatively-small concave grooves extending at an angle to the direction of the single depending prism and meeting in a series of angular ribs, said ribs presenting a roughened foot-surface and protecting the faces of the concave grooves from contact with the feet of pedestrians.

3. A vault-light of translucent material, consisting of a light-refracting portion depending from a flat top portion which is provided with a series of relatively-small concave grooves meeting in a series of angular ribs, said ribs presenting a roughened foot-surface and protecting the faces of the concave grooves from contact with the feet of pedestrians.

In testimony of which invention I have hereunto set my hand.

ROBT. M. COX.

Witnesses:
GEORGE P. GROSCH,
CHAS. M. WAGNER.